(12) United States Patent
Kim et al.

(10) Patent No.: US 8,134,678 B2
(45) Date of Patent: Mar. 13, 2012

(54) LIQUID CRYSTAL DISPLAY PANEL WITH IMPROVED DISPLAY CHARACTERISTICS AND MASK USED TO FABRICATE THE SAME

(75) Inventors: Yoon-jang Kim, Suwon-si (KR);
Dong-jin Seo, Cheonan-si (KR);
Yun-seok Lee, Cheonan-si (KR);
Cheon-jae Maeng, Suwon-si (KR);
Ji-hyeon Son, Seongnam-si (KR);
Jae-yong Shin, Daegu Metropolitan (KR)

(73) Assignees: Samsung Electronics Co., Ltd. (KR);
Seoul National University Industry Foundation (KR)

( * ) Notice: Subject to any disclaimer, the term of this patent is extended or adjusted under 35 U.S.C. 154(b) by 1078 days.

(21) Appl. No.: 11/538,595

(22) Filed: Oct. 4, 2006

(65) Prior Publication Data

US 2007/0103634 A1    May 10, 2007

(30) Foreign Application Priority Data

Nov. 10, 2005  (KR) ........................ 10-2005-0107631

(51) Int. Cl.
*G02F 1/1339*  (2006.01)

(52) U.S. Cl. ........................................ 349/153; 349/154
(58) Field of Classification Search .................... 349/154
See application file for complete search history.

(56) References Cited

U.S. PATENT DOCUMENTS

| | | | | |
|---|---|---|---|---|
| 5,933,209 | A * | 8/1999 | Yonemoto ..................... | 349/153 |
| 7,643,123 | B2 * | 1/2010 | Baek et al. .................... | 349/154 |
| 2002/0163615 | A1 * | 11/2002 | Fujioka et al. ................ | 349/154 |
| 2003/0117570 | A1 * | 6/2003 | Kim ............................... | 349/153 |
| 2003/0218710 | A1 * | 11/2003 | Hong ............................. | 349/122 |
| 2004/0160566 | A1 * | 8/2004 | Kawabe et al. ............... | 349/153 |

* cited by examiner

*Primary Examiner* — Mark Robinson
*Assistant Examiner* — Charles Chang
(74) *Attorney, Agent, or Firm* — Cantor Colburn LLP

(57) ABSTRACT

A liquid crystal display (LCD) panel with improved display characteristics includes a first display plate and a second display plate which face each other with a liquid crystal layer therebetween, a seal bonding the first display plate to the second display plate to prevent leakage of the liquid crystal layer, and an impurity blocking and liquid crystal flowing structure disposed inside a perimeter of the seal to prevent impurities from flowing from the seal to an active region in the first and second display plates while providing a flow path allowing liquid crystals to flow to the seal.

4 Claims, 18 Drawing Sheets

LIQUID CRYSTAL DISPLAY PANEL WITH IMPROVED DISPLAY CHARACTERISTICS AND MASK USED TO FABRICATE THE SAME

This application claims priority to Korean Patent Application No. 10-2005-0107631, filed on Nov. 10, 2005, and all the benefits accruing therefrom under 35 U.S.C. §119, the contents of which in its entirety are herein incorporated by reference.

BACKGROUND OF THE INVENTION

1. Field of the Invention

The present invention relates generally to a liquid crystal display ("LCD") panel with improved display characteristics and a mask used to fabricate the same, and more particularly to an LCD panel having an improved seal to prevent impurities from flowing from the seal to an active region of the LCD panel in which an image is displayed.

2. Description of the Related Art

An LCD is a display device having an LCD panel formed by bonding two display plates with liquid crystals therebetween. The LCD changes the array of the liquid crystals using an electric field formed in the LCD panel to adjust a light transmittance, thereby displaying an image.

The two display plates are aligned and bonded using a seal. The seal prevents the liquid crystals from leaking and protects liquid crystal cells from external circumstances and external environment. However, the seal is made of a thermosetting resin or an ultraviolet-curable resin and may not be satisfactorily hardened due to fabrication or material problems. The seal that is not hardened satisfactorily causes contact reaction with liquid crystals, thereby forming impurity particles. When the impurity particles flow into an active region in which an image is displayed, the light transmittance of the liquid crystals is changed, decreasing display characteristics of the LCD panel.

BRIEF SUMMARY OF THE INVENTION

The present invention provides a liquid crystal display ("LCD") panel with improved display characteristics and a mask used to fabricate the same.

According to an exemplary embodiment of the present invention, an LCD panel includes a first display plate and a second display plate which face each other with a liquid crystal layer therebetween, a seal bonding the first display plate to the second display plate to prevent leakage of the liquid crystal layer, and an impurity blocking and liquid crystal flowing structure disposed inside a perimeter of the seal to prevent impurities from flowing from the seal to an active region in the first and second display plates and provide a flow path allowing liquid crystals of the liquid crystal layer to flow to the seal.

According to another exemplary embodiment of the present invention, a mask for fabricating a color filter array includes a column spacer pattern, and an impurity blocking and liquid crystal flowing structure pattern.

According to still another exemplary embodiment of the present invention, a mask for fabricating a color filter array includes a protrusion pattern for controlling alignment of liquid crystals, and an impurity blocking and liquid crystal flowing structure pattern.

According to yet another exemplary embodiment of the present invention, a mask for fabricating a thin film transistor includes a contact hole pattern exposing a drain electrode of a thin film transistor, and an impurity blocking and liquid crystal flowing structure pattern.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
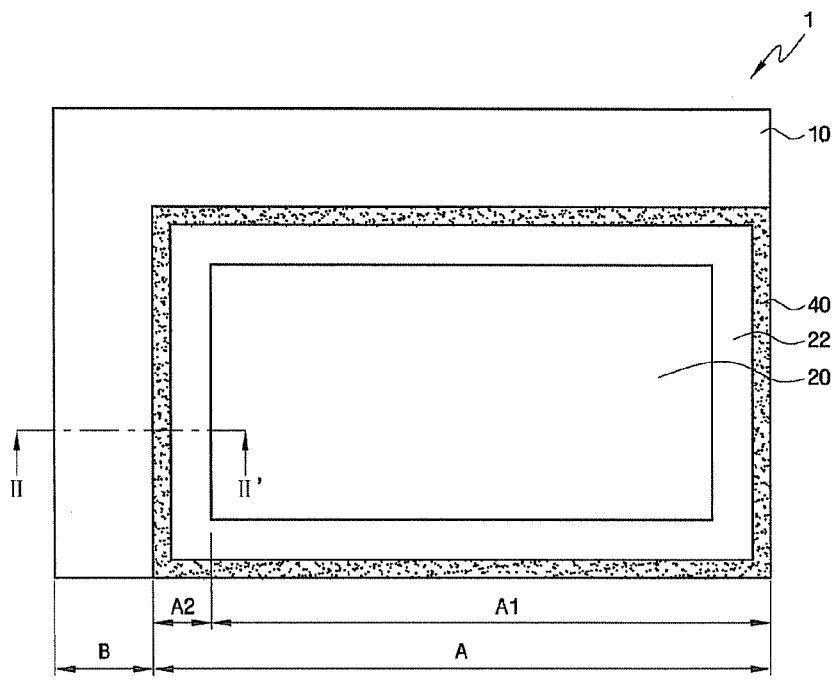
FIG. 1 is a plan view of an exemplary embodiment of a liquid crystal display ("LCD") panel according to the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein.

Rather, these exemplary embodiments are provided so that this disclosure will be thorough and complete and will fully convey the concept of the invention to those skilled in the art. Like reference numerals refer to like elements throughout the specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, a liquid crystal display ("LCD") panel including an impurity blocking and liquid crystal flowing structure will be described. The impurity blocking and liquid crystal flowing structure blocks the inflow of impurities into an active region corresponding to an actual image display region, thereby preventing deterioration of display characteristics due to the impurities, and which provides a liquid crystal flow path allowing liquid crystals to flow freely so that the liquid crystals in the active region are uniformly diffused throughout a liquid crystal margin region, and a mask used to fabricate the LCD panel will be described.

Figure 2:
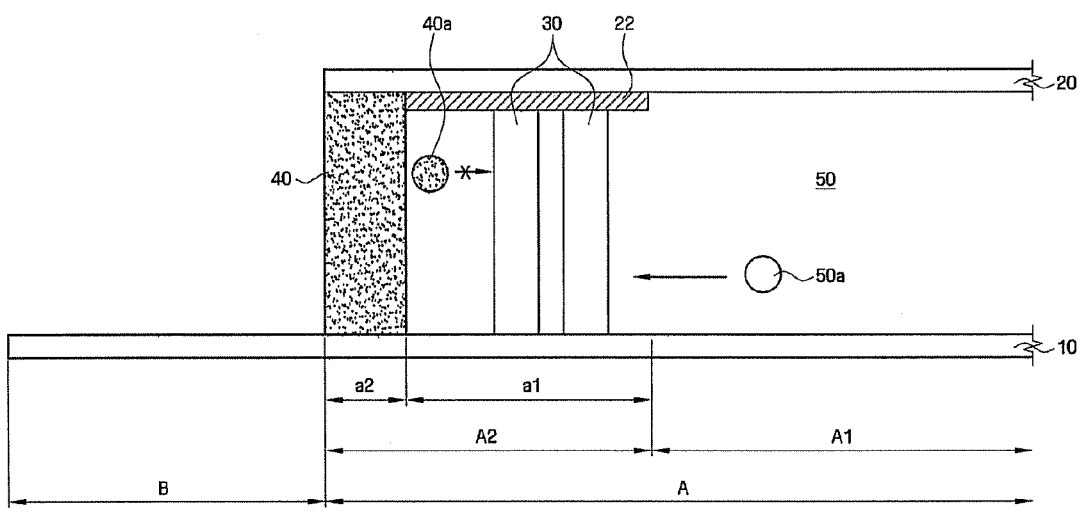
FIG. 2 is an enlarged cross-sectional view of the LCD panel, taken along line II-II' shown in FIG. 1.

FIG. 1 is a plan view of an exemplary embodiment of an LCD panel 1 according to the present invention. FIG. 2 is a cross-sectional view of the LCD panel 1, taken along the line II-II' shown in FIG. 1.

Referring to FIGS. 1 and 2, the LCD panel 1 is divided into a display portion A and a non-display portion B.

The non-display portion B is formed by a first display plate 10 larger than a second display plate 20. A gate pad (not shown) and a data pad (not shown), which are connected to a driving circuit transmitting a signal for displaying an image on the display portion A, are formed in the non-display portion B.

The display portion A is formed by the first display plate 10 and the second display plate 20, which are aligned facing each other and bonded to each other. An image is displayed in the display portion A. The display portion A is divided into an active region A1 and a liquid crystal margin region A2.

The active region A1 includes a plurality of pixels that are driven using an active matrix drive so that an image is displayed according to an electric field formed in each pixel.

The liquid crystal margin region A2 is formed at an edge of the active region A1 to allow liquid crystals accumulated in or injected into the active region A1 to be uniformly diffused throughout the display portion A and prevent the liquid crystals from inclining to one direction due to gravity.

In a typical LCD panel, the liquid crystal margin region A2 is comprised of a black matrix region a1 and a seal region a2 (FIG. 2). The black matrix region a1 is covered with a mold frame or the like and includes a black matrix 22 to block unnecessary light coming from an outside. The black matrix region a1 is called a frame region.

In FIGS. 1 and 2, the black matrix region a1 and the seal region a2 do not overlap with each other, but they may overlap such that a seal 40 is formed on the black matrix 22. Although the black matrix 22 is formed on the second display plate 20 in FIGS. 1 and 2, the black matrix 22 may be formed on the first display plate 10 in an LCD panel having a thin film transistor ("TFT") on array ("TOA") or color filter on TFT ("COT") structure.

The first display plate 10 and the second display plate 20 are bonded to each other using the seal 40 formed along the seal region a2 corresponding to the edge of the second display plate 20. The seal 40 prevents a liquid crystal layer 50 interposed between the first display plate 10 and the second display plate 20 from leaking outside and prevents external moisture and air from flowing into the liquid crystal layer 50.

Meanwhile, an impurity blocking and liquid crystal flowing structure 30 is installed inside the seal 40. The impurity blocking and liquid crystal flowing structure 30 blocks an impurity 40a, which is generated by the reaction between the seal 40 that is not hardened and a liquid crystal 50a in the liquid crystal layer 50, from flowing into the active region A1 and simultaneously provides a flow path allowing the liquid crystal 50a to flow to the seal 40. In order to initially block the impurity 40a from flowing into the active region A1 and prevent the impurity 40a from hindering image display, the impurity blocking and liquid crystal flowing structure 30 may be formed in the liquid crystal margin region A2. In addition, the impurity blocking and liquid crystal flowing structure 30 may help to maintain a cell gap between the first and second display plates 10 and 20.

Various configurations of the impurity blocking and liquid crystal flowing structure 30 will be described with reference to FIGS. 3A through 5C.

Referring to FIGS. 3A through 3D, the impurity blocking and liquid crystal flowing structure 30 blocks the impurity 40a from flowing into the active region A1 and simultaneously provides a flow path 70 for the liquid crystal 50a. Accordingly, the impurity blocking and liquid crystal flowing structure 30 may have a discontinuous configuration with a flow path space S. In detail, the impurity blocking and liquid crystal flowing structure 30 may include patterns 30a or 30b separated from each other by the flow path space S. Usually, since the impurity 40a is generated when the liquid crystal 50a reacts with the seal 40 that is not hardened, the impurity 40a may be larger than the liquid crystal 50a. Accordingly, when the flow path space S is greater than the size of the liquid crystal 50a and smaller than the size of the impurity 40a, selective flow can be realized.

Figure 3A:
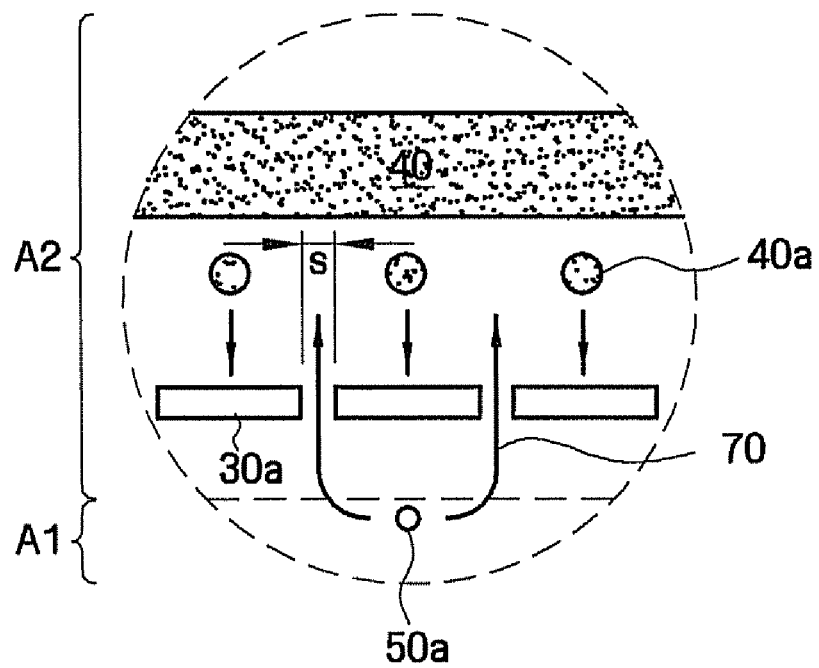
FIGS. 3A through 5C schematically illustrate various exemplary embodiments of impurity blocking and liquid crystal flowing structures according to the present invention.
Figure 3B:
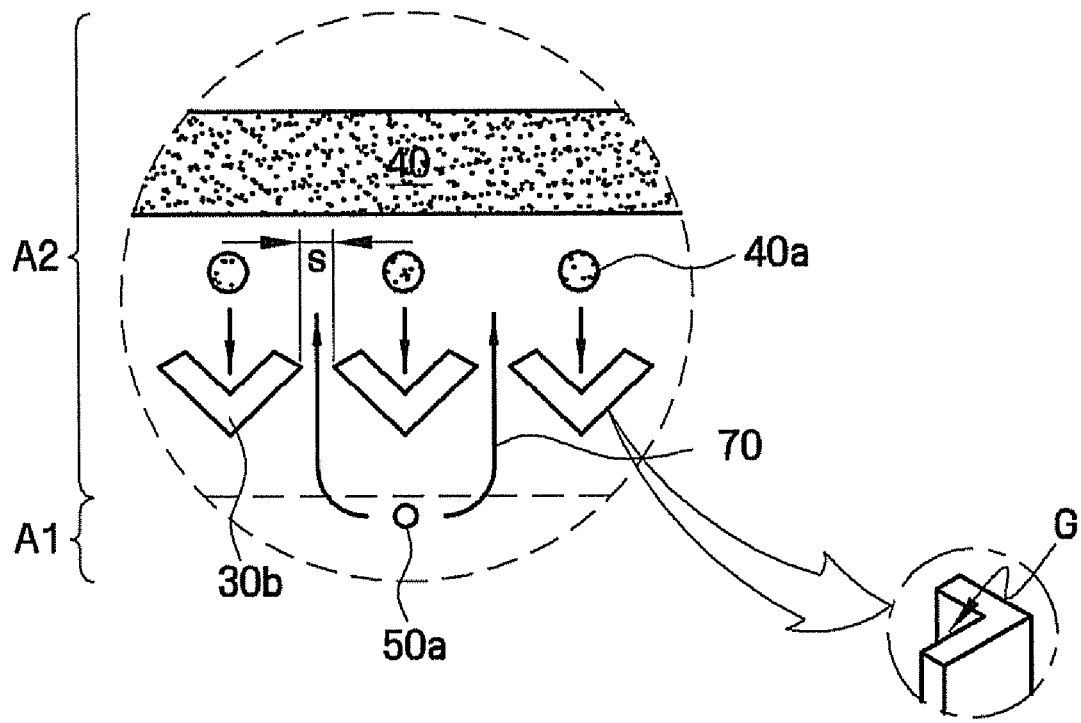

Meanwhile, when the patterns 30b have at least one trap groove G as shown in FIG. 3B, the inflow of the impurity 40a can be even more effectively blocked. To effectively trap the impurity 40a, a concave surface of the trap groove G may be formed to face the seal 40.

Figure 3C:
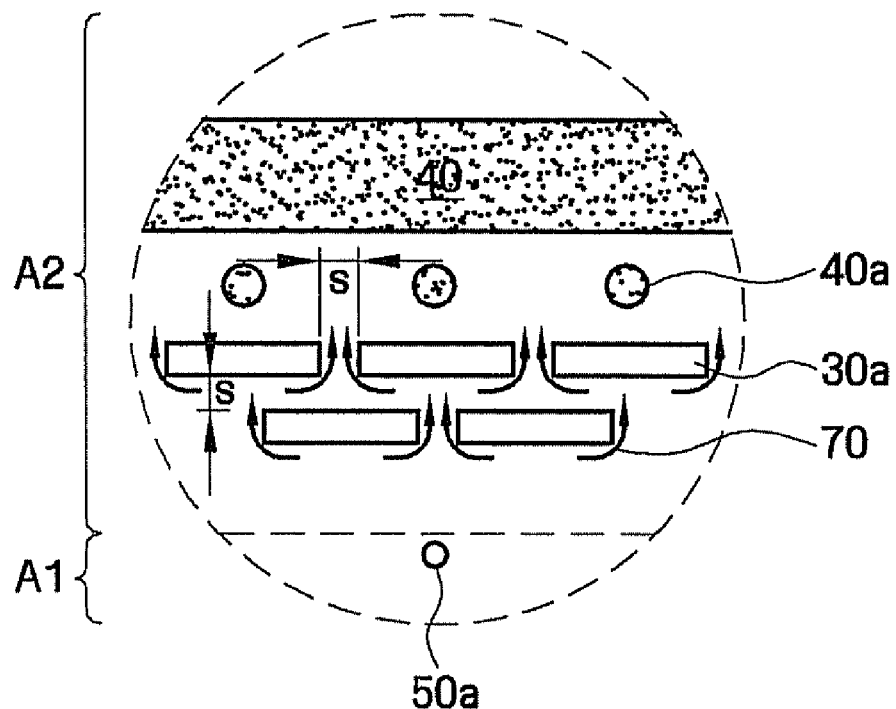
Figure 3D:
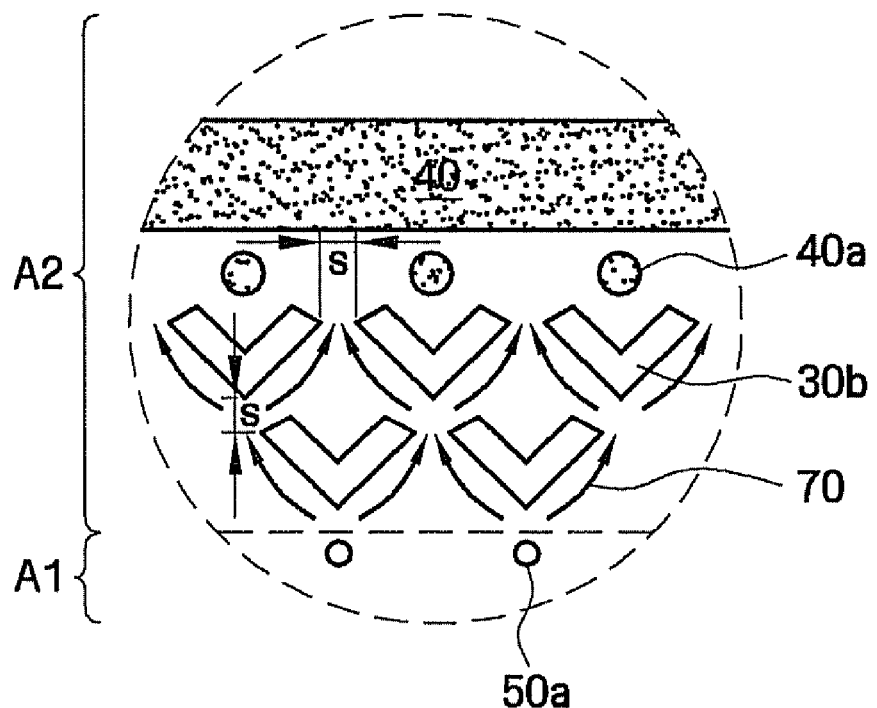

Furthermore, when the patterns 30a or 30b are alternately arranged in at least two lines or rows as shown in FIGS. 3C and 3D, the impurity 40a can be more effectively trapped. In such a configuration, even when the impurity 40a is not trapped by the patterns 30a or 30b in a first line or row and passes through the flow path 70, it may be trapped by the patterns 30a or 30b in a second line or row. Here, both ends of each pattern 30a or 30b in the second line may partially overlap with adjacent two patterns 30a or 30b, respectively, in the first line to guarantee perfect trapping (e.g., the patterns 30a and 30b are not aligned in a column direction).

Figure 4:
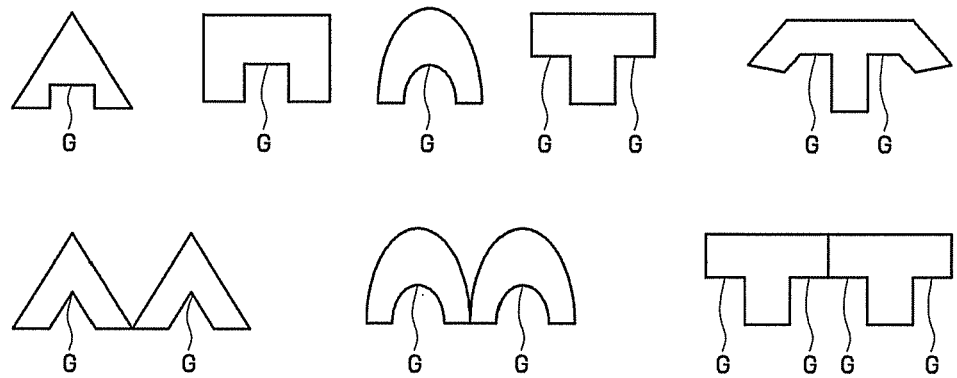

FIG. 4 illustrates various examples of a pattern included in the impurity blocking and liquid crystal flowing structure 30. As illustrated in FIG. 4, patterns having at least one trap groove G may be more effective than a pattern having a single trap groove G.

Figure 5A:
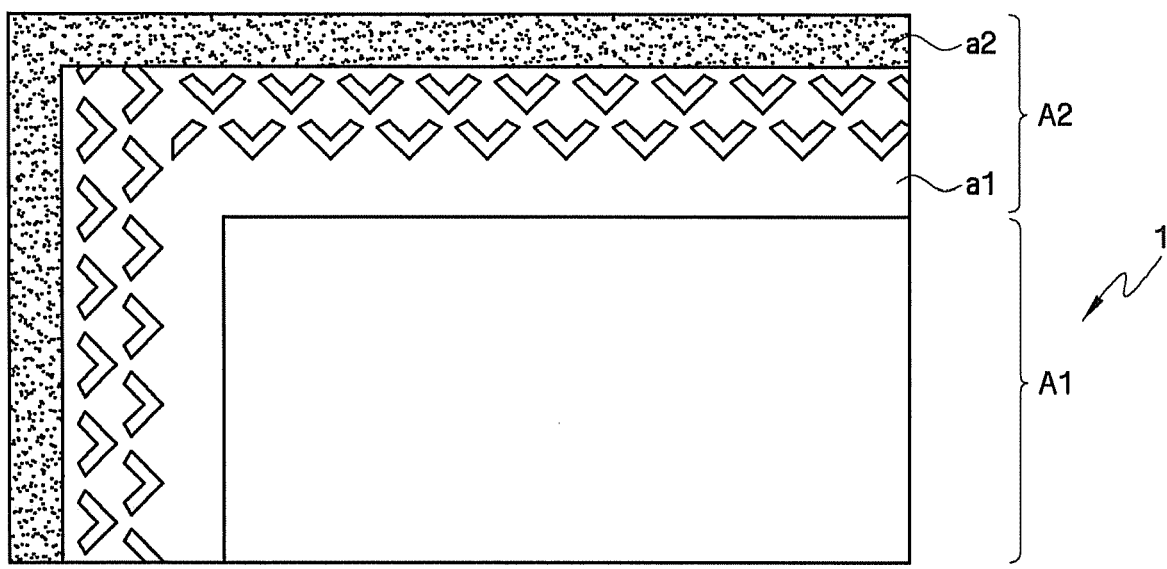
Figure 5B:
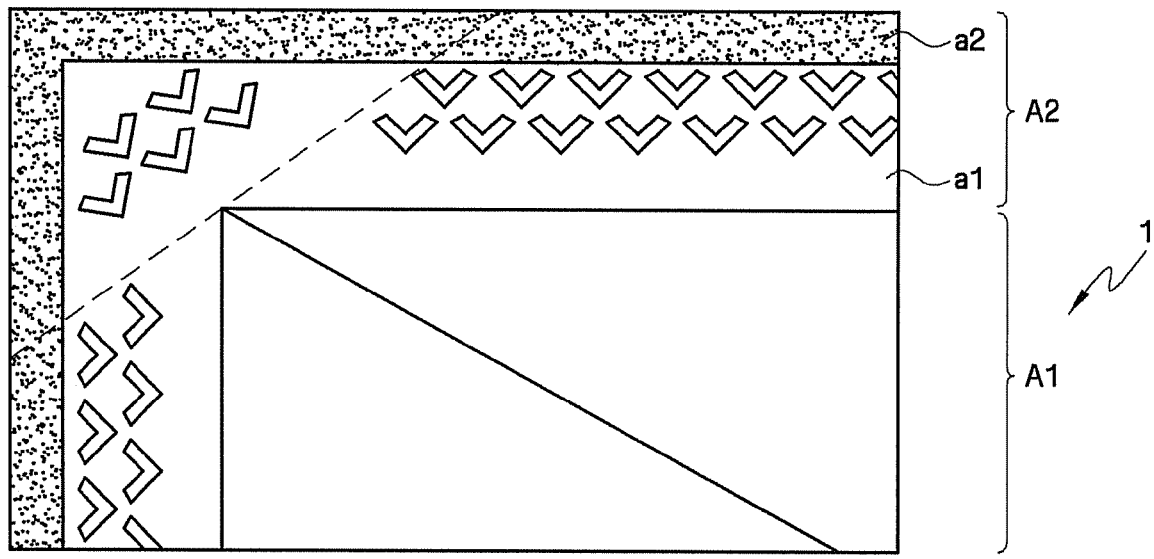
Figure 5C:
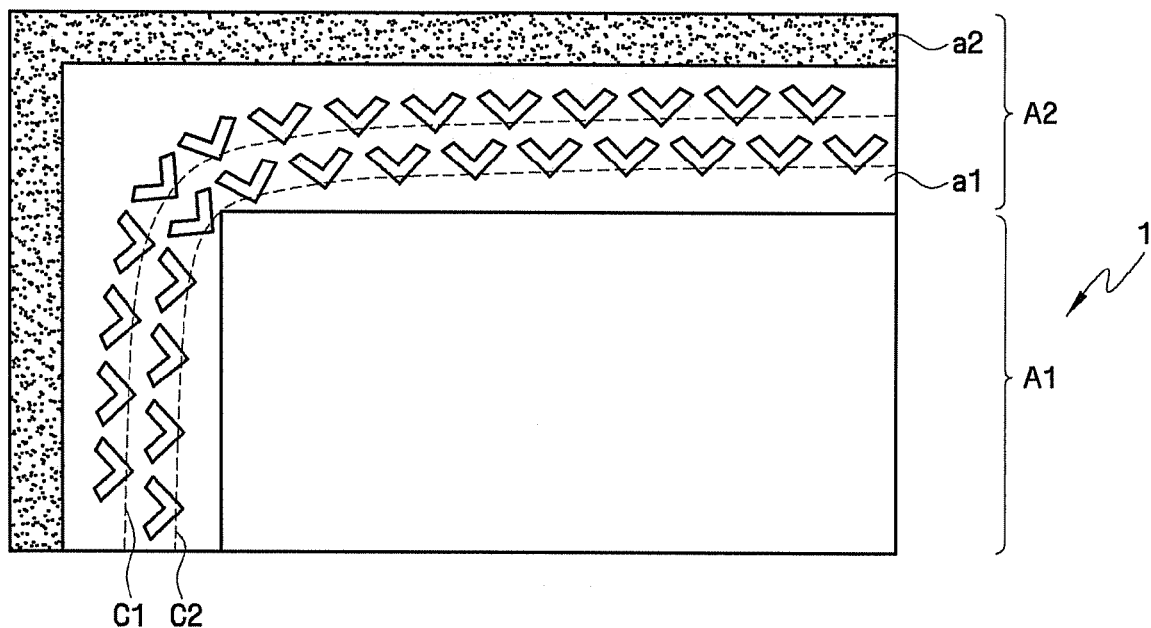

Meanwhile, the impurity blocking and liquid crystal flowing structure 30 may have various pattern arrays, as shown in FIGS. 5A through 5C, which illustrate a quarter portion of the LCD panel 1 shown in FIG. 1.

Referring to FIG. 5A, a plurality of patterns are linearly arranged in row and column directions of the LCD panel 1.

Referring to FIG. 5B, the arrangement of patterns is the same as that shown in FIG. 5A, with the exception that patterns at a corner of the LCD panel 1 are linearly arranged in a direction perpendicular to a diagonal of the LCD panel 1. With the arrangement shown in FIG. 5B, liquid crystals are more effectively diffused into the liquid crystal margin region A2 at the corner of the LCD panel 1.

Referring to FIG. 5C, a plurality of patterns are arranged along curves c1 and c2 having a predetermined curvature appropriate for providing an optimal flow path with respect to a diffusion direction of liquid crystals in every region of the LCD panel 1.

The LCD panel 1 described with respect to FIGS. 1 through 5C may be realized in various embodiments according to the initial alignment of major axes of liquid crystals used to display an image in the active region A1 of the first and second display plates 10 and 20, the method of forming an electric field to display an image, and the arrangement of units for forming an electric field. Hereinafter, diverse LCD panels and masks used to fabricate LCD panels according to various exemplary embodiments of the present invention will be described with reference to FIGS. 6 through 17.

FIGS. 6 through 9B are diagrams illustrating LCD panels in a twisted nematic ("TN") mode in which the direction of major axes of liquid crystals is parallel with major planar surfaces defining the first and second display plates 10 and 20 when an electric field is not applied, according to exemplary embodiments of the present invention.

Figure 6:
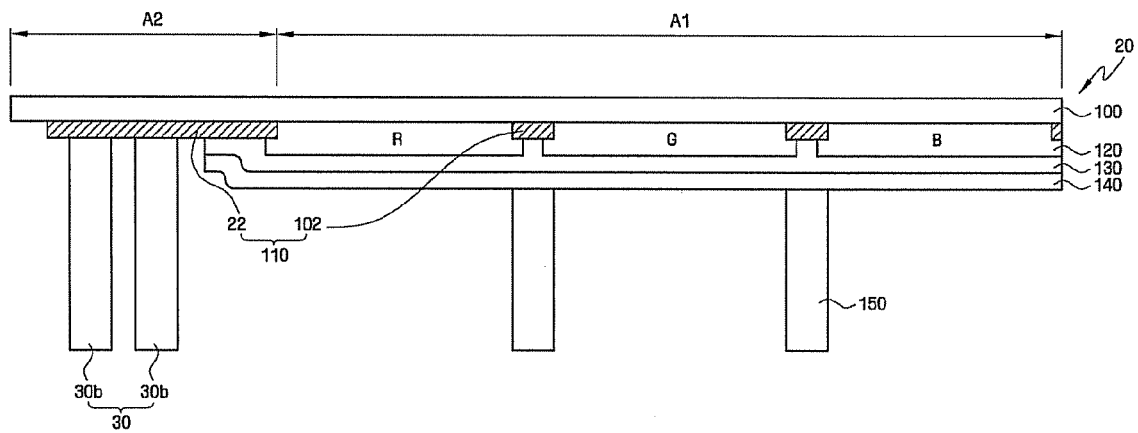
FIG. 6 is a cross-sectional view of an exemplary embodiment of a color filter array plate corresponding to a second display plate in a twisted nematic ("TN") mode LCD panel, according to the present invention.

FIG. 6 is a cross-sectional view of a color filter array plate corresponding to the second display plate 20 in a TN mode LCD panel. Referring to FIG. 6, a black matrix 110 is formed on a transparent substrate 100. The black matrix 110 includes a portion 102 formed in a region covering a TFT, gate wiring and data wiring formed in the active region A1 of the first display plate 10 and a portion 22 formed in the liquid crystal margin region A2. A color filter 120 is formed on the transparent substrate 100 having the black matrix 110. An overcoat layer 130 is formed on the color filter 120 to planarize steps formed by the color filter 120. However, the overcoat layer 130 may be eliminated. A single common electrode 140 is formed on the overcoat layer 130 throughout the active region A1. Column spacers 150 are formed on the common electrode 140 to maintain a cell gap between the first and second display plates 10 and 20. The impurity blocking and liquid crystal flowing structure 30 is formed on the portion 22 of the black matrix 110 in the liquid crystal margin region A2. In an aspect of simplification of fabrication, it is advantageous to form the column spacers 150 and the impurity blocking and liquid crystal flowing structure 30 using a same material in a single process.

Hereinafter, a method of fabricating the second display plate 20 shown in FIG. 6 according to an exemplary embodiment of the present invention will be described with reference to FIGS. 7A and 7B.

Figure 7A:
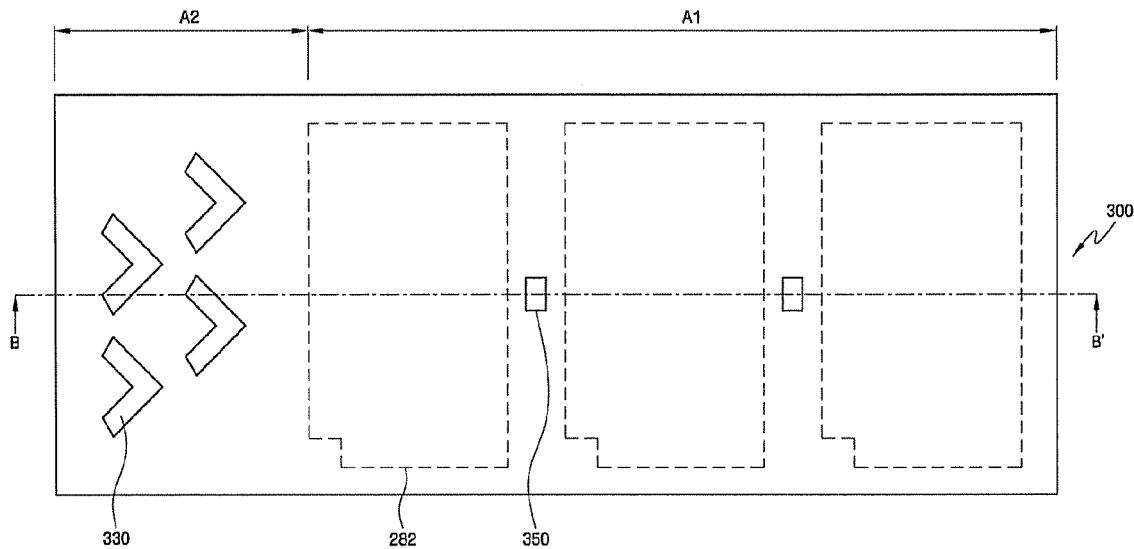
FIG. 7A illustrates a plan view layout of a mask used to fabricate the color filter array plate shown in FIG. 6.

FIG. 7A illustrates a layout of a mask 300 used to fabricate the column spacers 150 and the impurity blocking and liquid crystal flowing structure 30.

Referring to FIG. 7A, the mask 300 includes a plurality of column spacer patterns 350 formed in the active region A1 and a plurality of impurity blocking and liquid crystal flowing structure patterns 330 formed in the liquid crystal margin region A2. When an object of exposure is a positive, photosensitive organic insulation film, the patterns 350 and 330 may be shading patterns formed on a transparent substrate. When an object of exposure is a negative, photosensitive organic insulation film, the patterns 350 and 330 may be transmitting patterns. Meanwhile, when the impurity blocking and liquid crystal flowing structure 30 is higher than the column spacers 150, the column spacer patterns 350 may be formed as slit patterns, grating patterns, or semi-transmitting patterns. Here, critical dimensions ("CD") of a pattern positioned between slits or spacing between patterns, e.g., the width of the slit may be smaller than the resolution of an exposure device. When the semi-transmitting patterns are used, thin films having different transmittances or different thicknesses may be used to adjust transmittance during the fabrication of the mask 300. Reference numeral 282 denotes an outline of a pixel electrode formed on the first display plate 10.

Figure 7B:
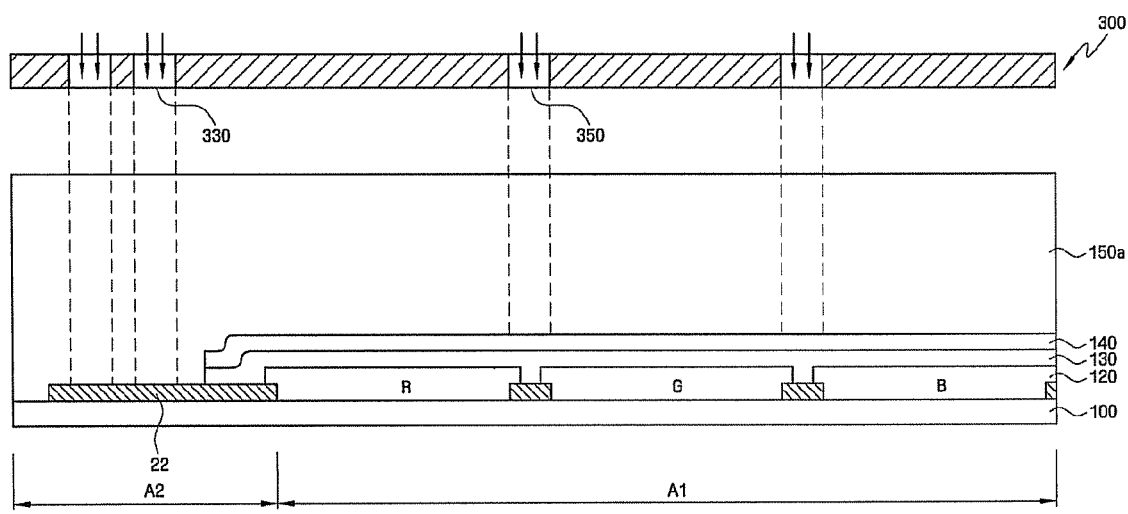
FIG. 7B is a cross-sectional view illustrating an exposure process using the mask shown in FIG. 7A.

FIG. 7B is a cross-sectional view illustrating an exposure process for forming the column spacers 150 and the impurity blocking and liquid crystal flowing structure 30.

Referring to FIG. 7B, the exposure process is performed on the substrate 100, on which the black matrix 110, the color filter 120, the overcoat layer 130, the common electrode 140, and a photosensitive organic insulation layer 150a have been sequentially formed, using the mask 300 shown in FIG. 7A. The black matrix 110 (e.g., 22 and 102), the color filter 120, the overcoat layer 130, the common electrode 140, and the photosensitive organic insulation layer 150a may be formed using fabrication processes well known to those skilled in the art of the present invention, and thus, the formation of them will be schematically described for sake of clarity of the present invention.

In the exposure process shown in FIG. 7B, the photosensitive organic insulation layer 150a is formed using a negative photosensitive organic insulation material. As shown in FIG. 7B, the photosensitive organic insulation layer 150a is cross-linked during the exposure process, and therefore, only exposed portions of the photosensitive organic insulation layer 150a remain during a succeeding developing process, thereby forming the column spacers 150 and the impurity blocking and liquid crystal flowing structure 30 shown in FIG. 6.

Figure 8A:
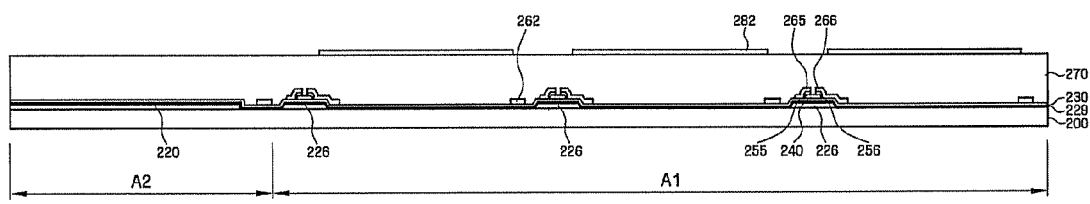
FIGS. 8A and 8B are a cross-sectional view and a plan view layout, respectively, illustrating a thin film transistor ("TFT") array plate corresponding to a first display plate forming the TN mode LCD panel together with the second display plate shown in FIG. 6, according to an exemplary embodiment of the present invention.
Figure 8B:
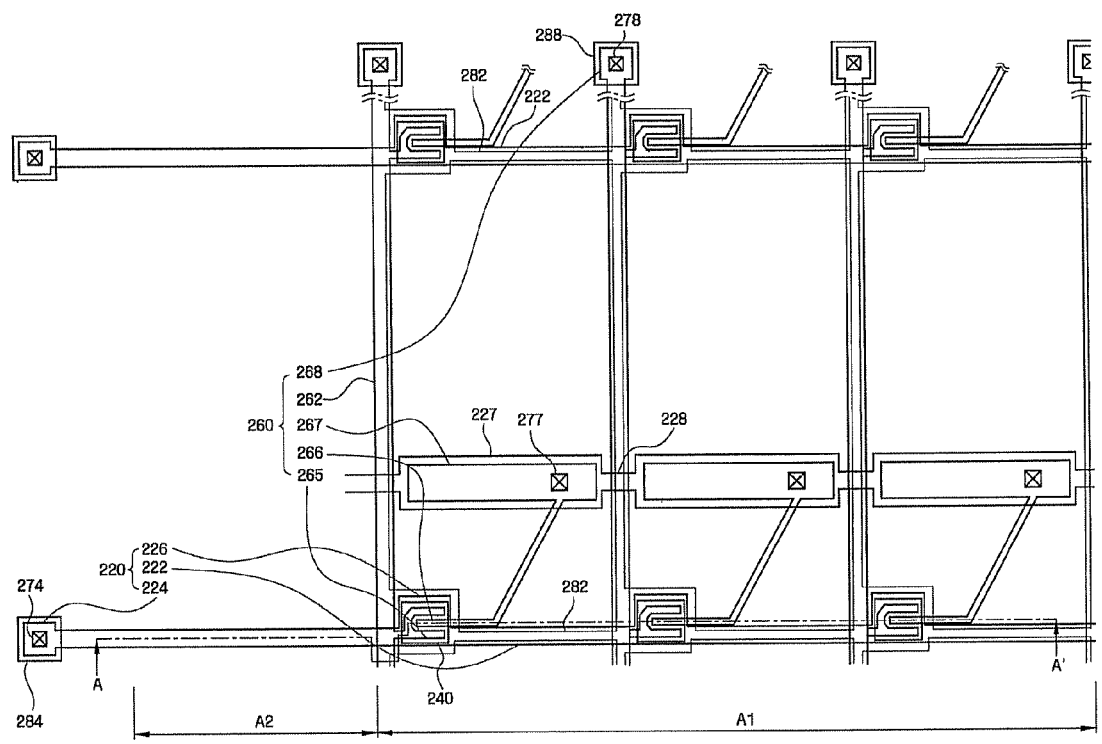

FIGS. 8A and 8B are a cross-sectional view and a plan view layout, respectively, illustrating a TFT array plate corresponding to the first display plate 10 forming the TN mode LCD panel together with the second display plate 20 shown in FIG. 6, according to an exemplary embodiment of the present invention.

Referring to FIGS. 8A and 8B, a plurality of gate wirings 220 transmitting a gate signal are formed on an insulation substrate 200. Each of the gate wirings 220 includes a gate line 222 extending in a horizontal direction, a gate pad 224 connected to an end of the gate line 222 to transmit an external gate signal to the gate line 222, and a gate electrode 226 of a TFT extending from the gate line 222 in a shape of a protrusion. Meanwhile, storage electrodes 227 are arranged to be parallel with the gate line 222. Adjacent storage electrodes 227 are connected to each other by a storage electrode line 228. In the exemplary embodiment of the present invention shown in FIGS. 8A and 8B, the storage electrodes 227 are separately formed, but a previous gate line 222 may be used as a storage electrode. Each of the storage electrodes 227 overlaps a drain electrode extension 267 connected to a pixel electrode 282, which will be described later, thereby forming a storage capacitor increasing the charge storage capacity of a pixel.

A capping layer 229 is formed on the gate wirings 220 to prevent heel-lock from occurring due to succeeding high-temperature heat treatment. A gate insulation layer 230 is formed on the capping layer 229. A semiconductor pattern 240 made using a semiconductor such as hydrogenated amorphous silicon or poly crystalline silicon is formed on the gate insulation layer 230. Ohmic contact patterns 255 and 256 are formed on the semiconductor pattern 240. The external profile of the semiconductor pattern 240 having a channel region therewithin is substantially the same as that of the ohmic contact patterns 255 and 256.

A data wiring 260 is formed on the ohmic contact patterns 255 and 256 and the gate insulation layer 230. The data wiring 260 includes a data line 262 extending in a vertical direction to cross the gate line 222, thereby defining a pixel; a source electrode 265 extending from the data line 262 to a top of the ohmic contact pattern 255; a data pad 268 connected to an end of the data line 262 to receive an external image signal; a drain electrode 266 separated from the source electrode 265 and formed on the ohmic contact pattern 256 opposite to the source electrode 265 with respect to the gate electrode 226 or the channel region of a TFT; and a drain electrode extension 267 extending from the drain electrode 266 to have a large area and overlapping the storage electrode 227.

The source electrode 265 overlaps at least a part of the semiconductor pattern 240. The drain electrode 266 faces the source electrode 265 around the gate electrode 226 and overlaps at least a part of the semiconductor pattern 240. The ohmic contact patterns 255 and 256 are positioned between the semiconductor pattern 240 therebelow and the source and drain electrodes 265 and 266 thereabove and serve to decrease contact resistance therebetween.

The drain electrode extension 267 overlaps the storage electrode 227, thereby forming storage capacitance together with the storage electrode 227 with the gate insulation layer 230 therebetween. When the storage electrode 227 is not formed, the drain electrode extension 267 is also eliminated.

A passivation layer 270 is formed on the data wiring 260 and the semiconductor pattern 240 that is not covered with the data wiring 260. When the passivation layer 270 is formed using an organic material, an insulation layer (not shown) may be additionally formed below the passivation layer 270 using silicon nitride ($SiN_x$) or silicon oxide ($SiO_2$) in order to prevent the organic material of the passivation layer 270 from contacting the semiconductor pattern 240 exposed between the source and drain electrodes 265 and 266.

A contact hole 277 exposing the drain electrode extension 267 and a contact hole 278 exposing the data pad 268 are formed in the passivation layer 270. A contact hole 274 exposing the gate pad 224 is formed in the passivation layer 270 and the gate insulation layer 230. A pixel electrode 282 is formed at a position of a pixel on the passivation layer 270 to be electrically connected with the drain electrode 266 through the contact hole 277. When a data voltage is applied, the pixel electrode 282 generates an electric field together with the common electrode 140 of the second display plate 20 shown in FIG. 6 and thus determines the arrangement of liquid crystal molecules in a liquid crystal layer positioned between the pixel electrode 282 and the common electrode 140 so that a desired image is displayed.

In addition, an auxiliary gate pad 284 connected with the gate pad 224 through the contact hole 274 and an auxiliary data pad 288 connected with the data pad 264 through the contact hole 278 are formed on the passivation layer 270.

Figure 9A:
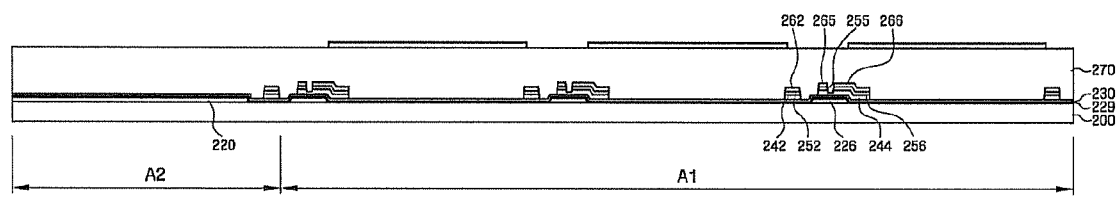
FIGS. 9A and 9B are a cross-sectional view and a plan view layout, respectively, illustrating a TFT array plate corresponding to the first display plate forming the TN mode LCD panel together with the second display plate shown in FIG. 6, according to another exemplary embodiment of the present invention.
Figure 9B:
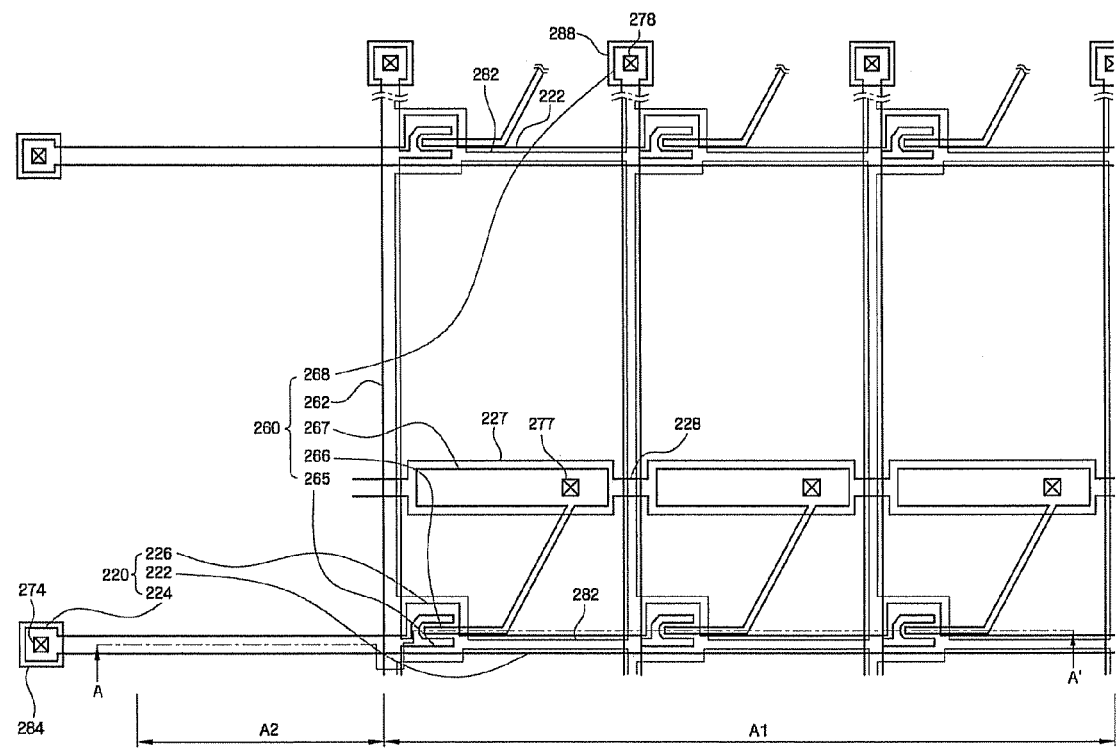

FIGS. 9A and 9B are a cross-sectional view and a plan view layout, respectively, illustrating a TFT array plate corresponding to the first display plate 10 forming the TN mode LCD panel together with the second display plate 20 described with reference to FIGS. 6 through 7B, according to another exemplary embodiment of the present invention. Descriptions of members substantially the same as those shown in FIGS. 8A and 8B will be omitted or simplified.

While five masks are used in the fabrication of the first display plate 10 shown in FIGS. 8A and 8B, four masks are used in the fabrication of the first display plate 10 shown in FIGS. 9A and 9B.

In detail, when the data wiring 260 is formed, an ohmic contact layer 252 and a semiconductor layer 242 are simultaneously patterned. As a result, the data line 262 crossing the gate line 222 to define a pixel has an ohmic contact layer 252 and a semiconductor pattern 242, which have the same profile as the data line 262. The data pad 268 connected to an end of the data line 262 to receive an external image signal also has an ohmic contact layer (not shown) and a semiconductor pattern (not shown), which have substantially the same profile as the data pad 268. The drain electrode extension 267 extending from the drain electrode 266 to overlap the storage electrode 227 also has an ohmic contact layer (not shown) and a semiconductor pattern (not shown), which have substantially the same profile as the drain electrode extension 267.

The external profile of a semiconductor pattern 244 including a channel region forming a TFT and the external profile of the ohmic contact patterns 255 and 256 are substantially the same as that of the source and drain electrodes 265 and 266. In detail, like the source electrode 265 is separated from the drain electrode 266 at the channel region of the TFT, the ohmic contact pattern 255 underlying the source electrode 265 is separated from the ohmic contact pattern 256 underlying the drain electrode 266 at the channel region. However, the semiconductor pattern 244 for the TFT is not discontinuous at the channel region, thereby forming a channel of the TFT.

FIGS. 10A through 13B are diagrams for explaining LCD panels in a vertical alignment ("VA") mode in which the direction of major axes of liquid crystals is perpendicular to major surface planes defining the first and second display plates 10 and 20 when an electric field is not applied, according to exemplary embodiments of the present invention. The VA mode may be divided into a patterned VA ("PVA") or super PVA ("SPVA") mode in which a pixel electrode corresponding to a unit for forming an electric field and a common electrode are patterned and a multidomain VA ("MVA") mode in which a protrusion is formed on the common electrode or protrusions are formed on the both of common electrode and the pixel electrode.

Figure 10A:
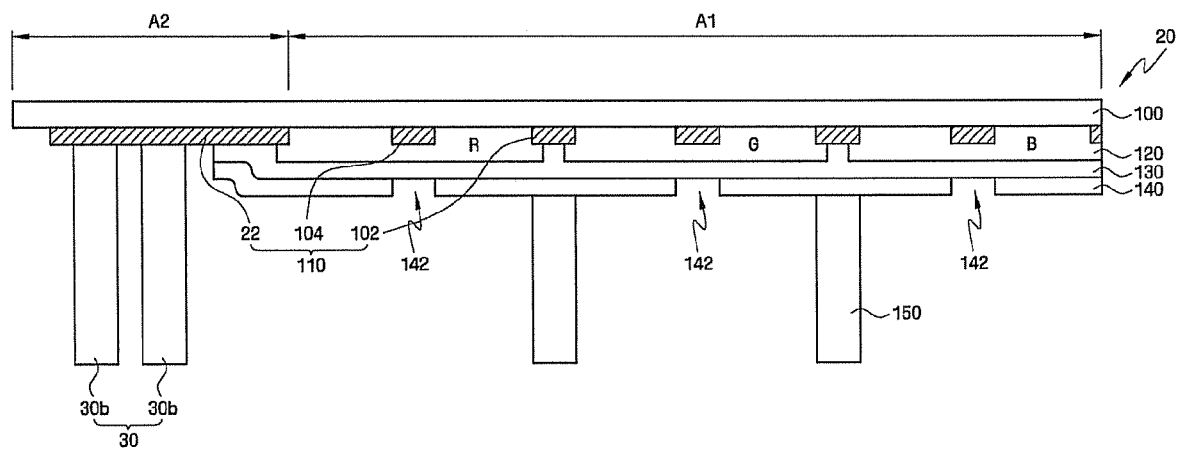
FIGS. 10A and 10B are a cross-sectional view of a color filter array plate corresponding to a second display plate and a plan view layout of a common electrode in a patterned vertical alignment ("PVA")/super PVA ("SPVA") mode LCD panel, according to an exemplary embodiment of the present invention.
Figure 10B:
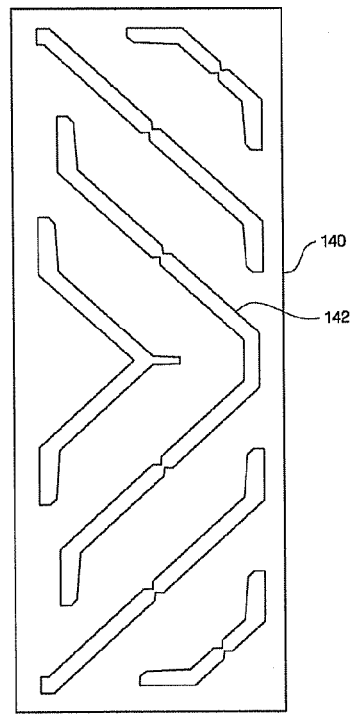

FIGS. 10A and 10B are a cross-sectional view of a color filter array plate corresponding to the second display plate 20 and a plane view layout of a common electrode 140 in a PVA/SPVA mode LCD panel, according to an exemplary embodiment of the present invention.

Referring to FIGS. 10A and 10B, the black matrix 110 is formed on the transparent substrate 100. The black matrix 110 includes the portion 102 formed in a region covering a TFT, gate wiring and data wiring formed in the active region A1 of the first display plate 10, a portion 104 covering a cutout 142 in the common electrode 140, and the portion 22 formed in the liquid crystal margin region A2. The color filter 120 is formed on the transparent substrate 100 having the black matrix 110. The overcoat layer 130 is formed on the color filter 120. The common electrode 140 has a plurality of cutouts 142 inclining at an angle of about 45 or about −45 degrees relative to the gate line 222 shown in FIG. 11A for each pixel.

The column spacers 150 are formed on the common electrode 140 having the cutouts 142 to maintain a cell gap between the first and second display plates 10 and 20. The impurity blocking and liquid crystal flowing structure 30 is formed on the portion 22 of the black matrix 110 in the liquid crystal margin region A2 using the same material as the column spacers 150 and using the same process in which the column spacers 150 are formed.

The column spacers 150 and the impurity blocking and liquid crystal flowing structure 30 illustrated in FIG. 10A can be formed using the mask and the method described with reference to FIGS. 7A and 7B. Thus, a description thereof will be omitted.

Figure 11A:
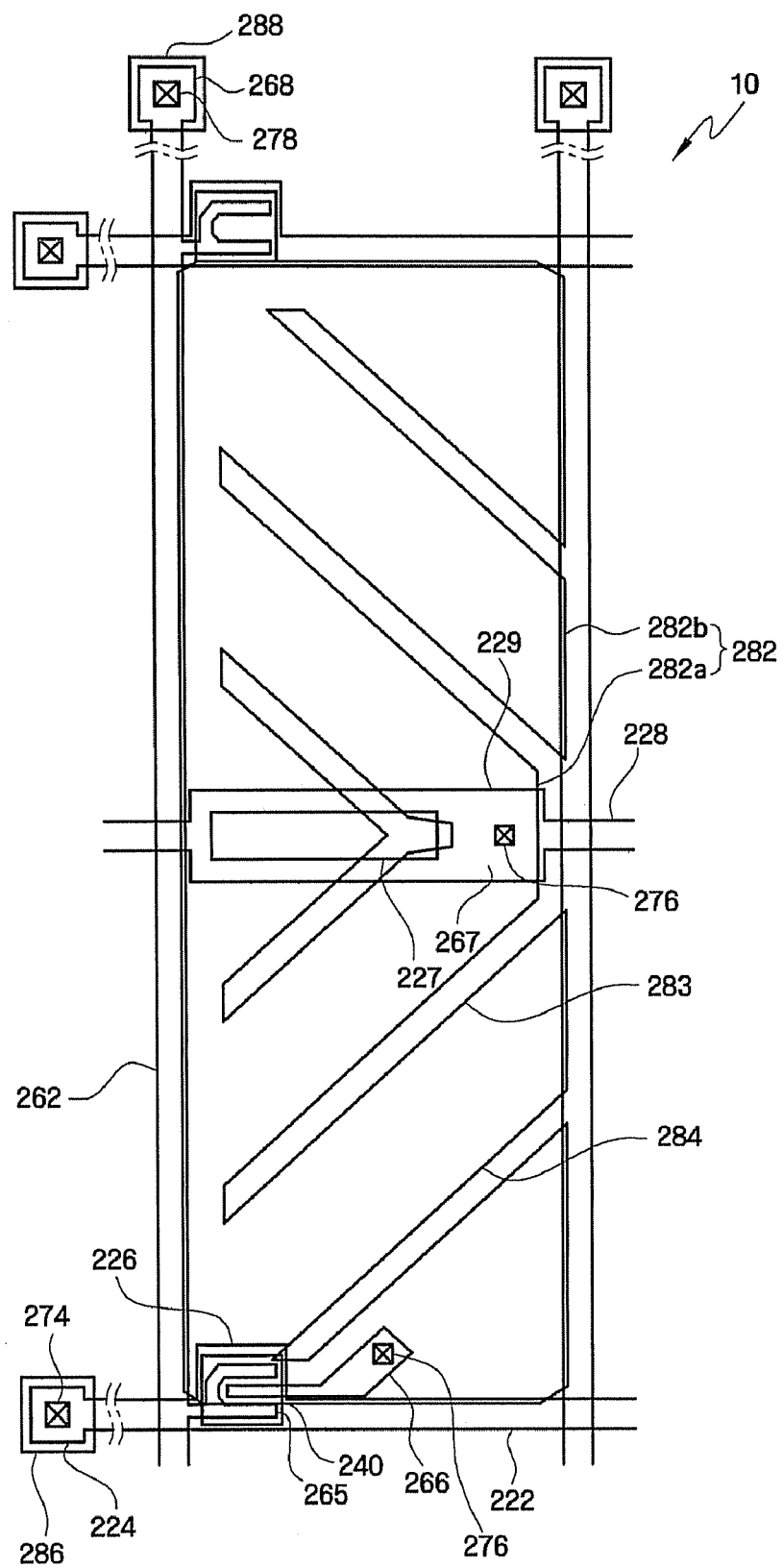
FIGS. 11A through 11C are plan view layouts of a TFT array plate corresponding to a first display panel forming a vertical alignment ("VA") mode LCD panel together with the second display plate shown in FIGS. 10A and 10B, according to exemplary embodiments of the present invention.
Figure 11B:
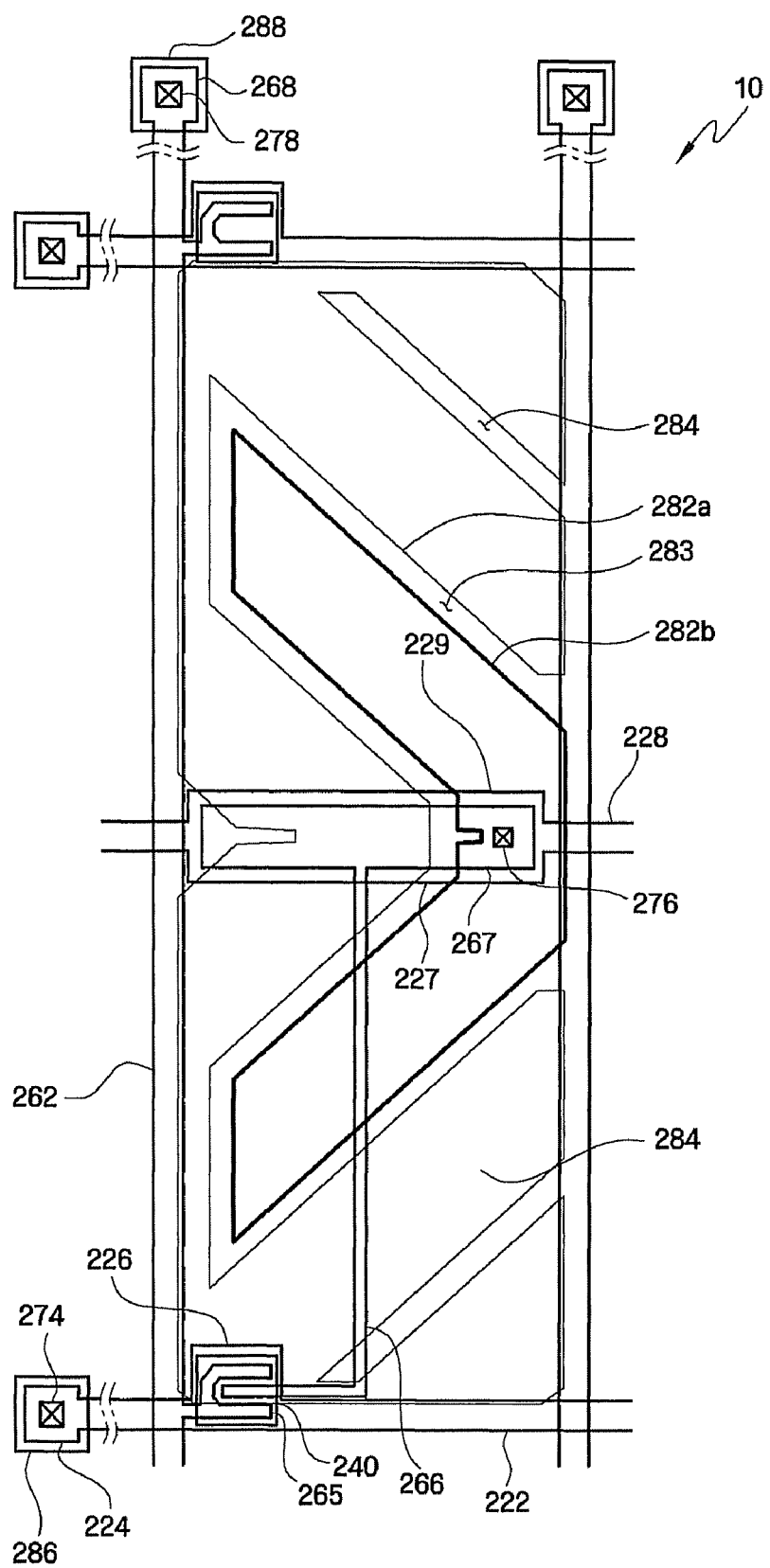
Figure 11C:
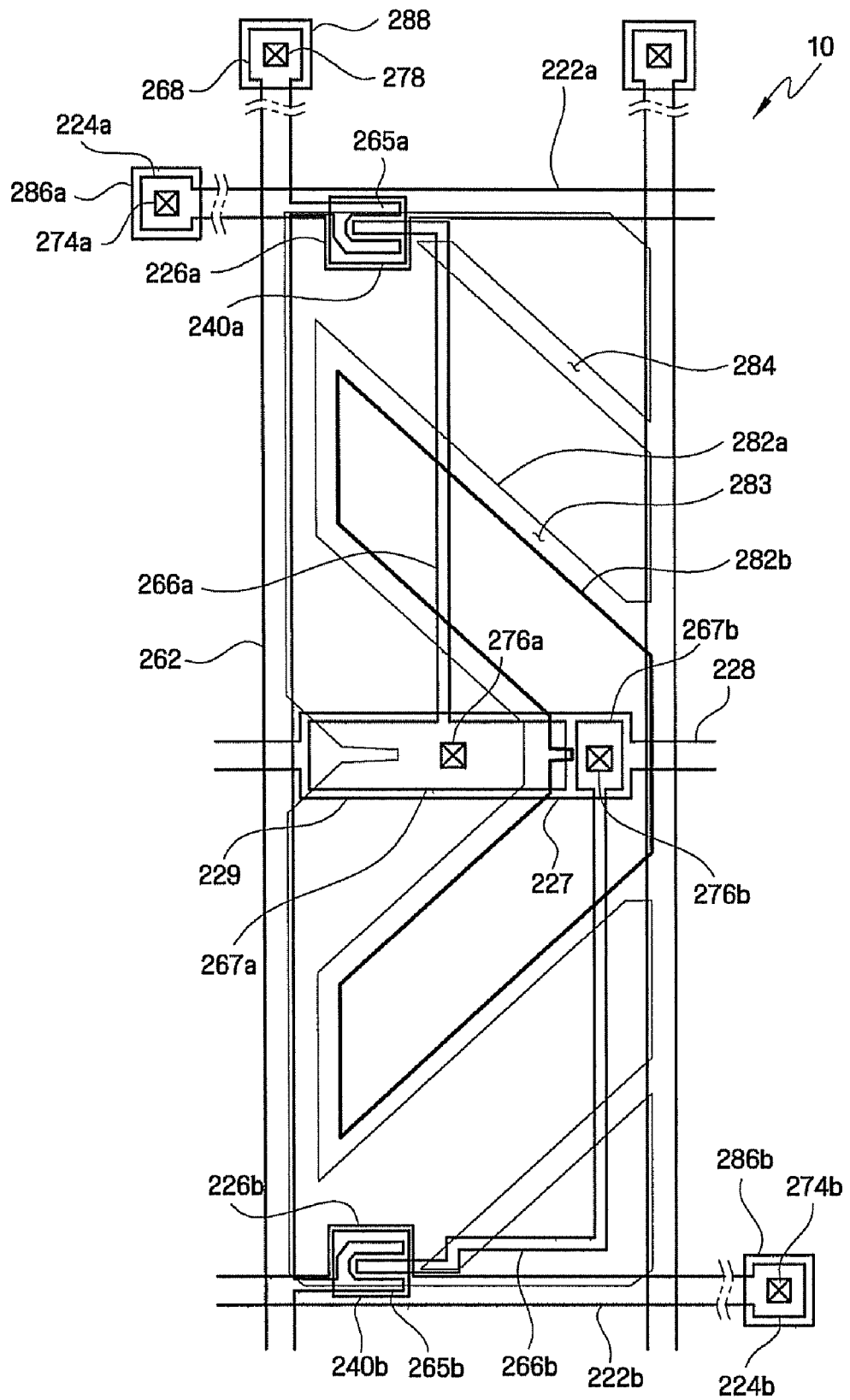

FIGS. 11A through 11C are plan view layouts of a TFT array plate corresponding to the first display plate 10 forming a VA mode LCD panel together with the second display plate 20 shown in FIGS. 10A and 10B, according to exemplary embodiments of the present invention.

FIG. 11A is a plan view layout of a TFT array plate according to the PVA mode. FIG. 11B is a plan view layout of a TFT array plate according to the SPVA mode using coupling capacitance. FIG. 11C is a plan view layout of a TFT array plate according to the SPVA mode using two transistors.

In FIGS. 11A through 11C, the same reference numerals as those shown in FIGS. 8B and 9B and the same reference numerals with an additional alphabet character denote the same members as those shown in FIGS. 8B and 9B. Thus, detailed descriptions thereof will be omitted for sake of clarity of the present invention.

Unlike the pixel electrode 282 shown in FIG. 8B, the pixel electrode 282 shown in FIG. 11A includes a plurality of cutouts 283. The cutouts 283 of the pixel electrode 282 are arranged such that a cutout 142 of the common electrode 140 is disposed between cutouts 283 to divide a display region of each pixel into a plurality of domains. In this situation, liquid crystal molecules are made to incline in various directions in the plurality of domains so that a standard viewing angle is increased to improve side visibility.

Unlike the pixel electrode 282 shown in FIG. 11A, the pixel electrode 282 shown in FIG. 11B is divided into a first sub-pixel electrode 282a and a second sub-pixel electrode 282b. The first sub-pixel electrode 282a and the second sub-pixel electrode 282b divide a pixel area into two portions, i.e., an upper portion and a lower portion and are symmetrical with respect to a line parallel with the gate line 222. A cutout 283 formed within each of the first and second sub-pixel electrodes 282a and 282b and a gap 284 between the first and second sub-pixel electrodes 282a and 282b divide a pixel into a plurality of domains together with the common electrode 140. While the first sub-pixel electrode 282a directly receives an image signal voltage through the drain electrode 266 of a TFT, the second sub-pixel electrode 282b has a variable voltage due to capacitance coupling to the drain electrode extension 267. In other words, the voltage of the second sub-pixel electrode 282b always has a lower absolute value than the voltage of the first sub-pixel electrode 282a. When two sub-pixel electrodes having different voltages are disposed within a single pixel area, the two sub-pixel electrodes compensate for each other, thereby decreasing distortion in a gamma curve.

Unlike the TFT array plate shown in FIG. 11B, in the TFT array plate shown in FIG. 11C, the first sub-pixel electrode 282a and the second sub-pixel electrode 282b individually receive image signal voltages through drain electrodes 266a and 266b, respectively, included in different TFTs, respectively. Accordingly, one more TFT is symmetrically formed at an edge of a pixel. Since individual image signal voltages are respectively applied to the first and second sub-pixel electrodes 282a and 282b, the side visibility is increased, and simultaneously, distortion in the gamma curve is decreased more effectively than in the TFT array plate shown in FIG. 11B.

Figure 12A:
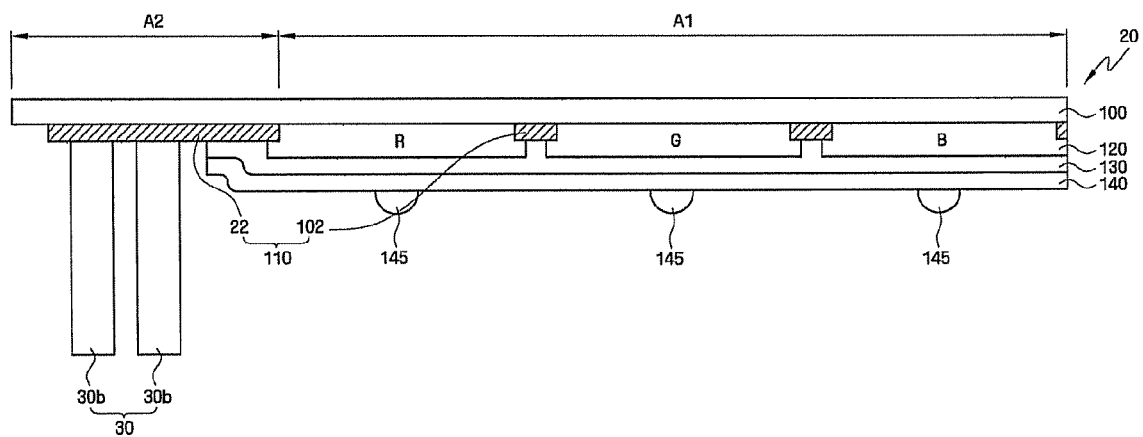
FIGS. 12A through 12C are cross-sectional views of a color filter array plate corresponding to a second display plate in a multidomain VA ("MVA") mode LCD panel, according to exemplary embodiments of the present invention.
Figure 12B:
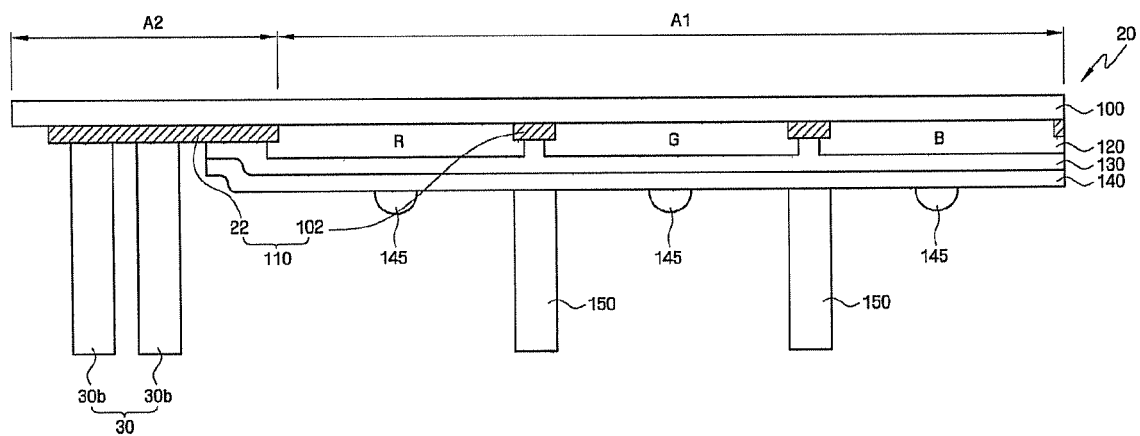
Figure 12C:
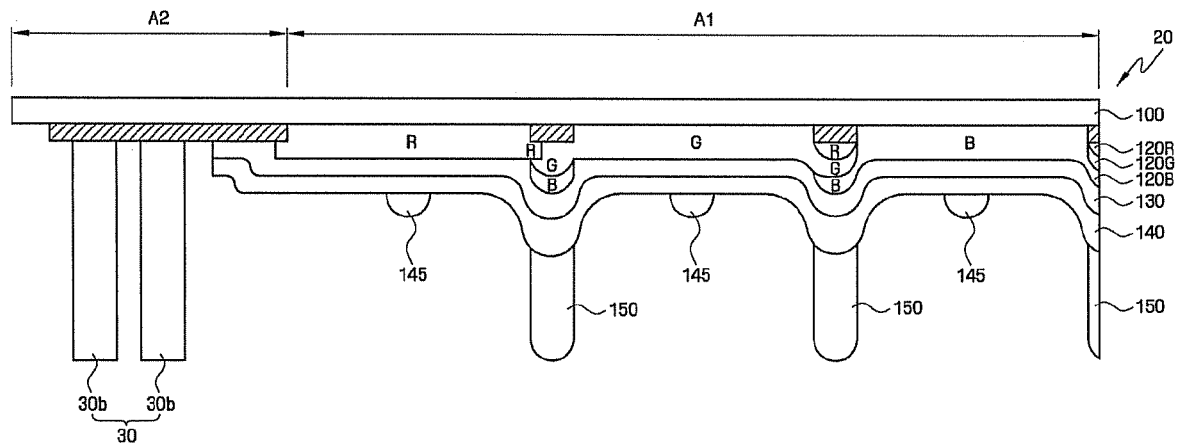

FIGS. 12A through 12C are cross-sectional views of a color filter array plate corresponding to the second display plate 20 in a MVA mode LCD panel, according to exemplary embodiments of the present invention.

Referring to FIGS. 12A through 12C, the black matrix 110 is formed on the transparent substrate 100. The black matrix 110 includes the portion 102 formed in a region covering a TFT, gate wiring and data wiring formed in the active region A1 of the first display plate 10 and the portion 22 formed in the liquid crystal margin region A2. The color filter 120 is formed on the transparent substrate 100 having the black matrix 110. The overcoat layer 130 is formed on the color filter 120. The single common electrode 140 is formed on the overcoat layer 130 throughout the active region A1. A plurality of protrusions 145 are formed on the common electrode 140 to divide a pixel into a plurality of domains so that alignment of liquid crystals is controlled. Referring to FIG. 12A, the impurity blocking and liquid crystal flowing structure 30 is formed in the liquid crystal margin region A2 using the same material as the protrusions 145 and using the same process in which the protrusions 145 are formed. In this situation, column spacers (not shown) may be formed using scattering or using a separate patterning process from the protrusions 145 and the impurity blocking and liquid crystal flowing structure 30.

Referring to FIG. 12B, the protrusions 145, the column spacers 150 and the impurity blocking and liquid crystal flowing structure 30 are simultaneously formed using the same material.

Like the color filter array plate shown in FIG. 12B, in the color filter array plate shown in FIG. 12C, the protrusions 145, the column spacers 150 and the impurity blocking and liquid crystal flowing structure 30 are simultaneously formed using the same material, and additionally, a stack of RGB color filter patterns is formed under the column spacers 150.

Figure 13A:
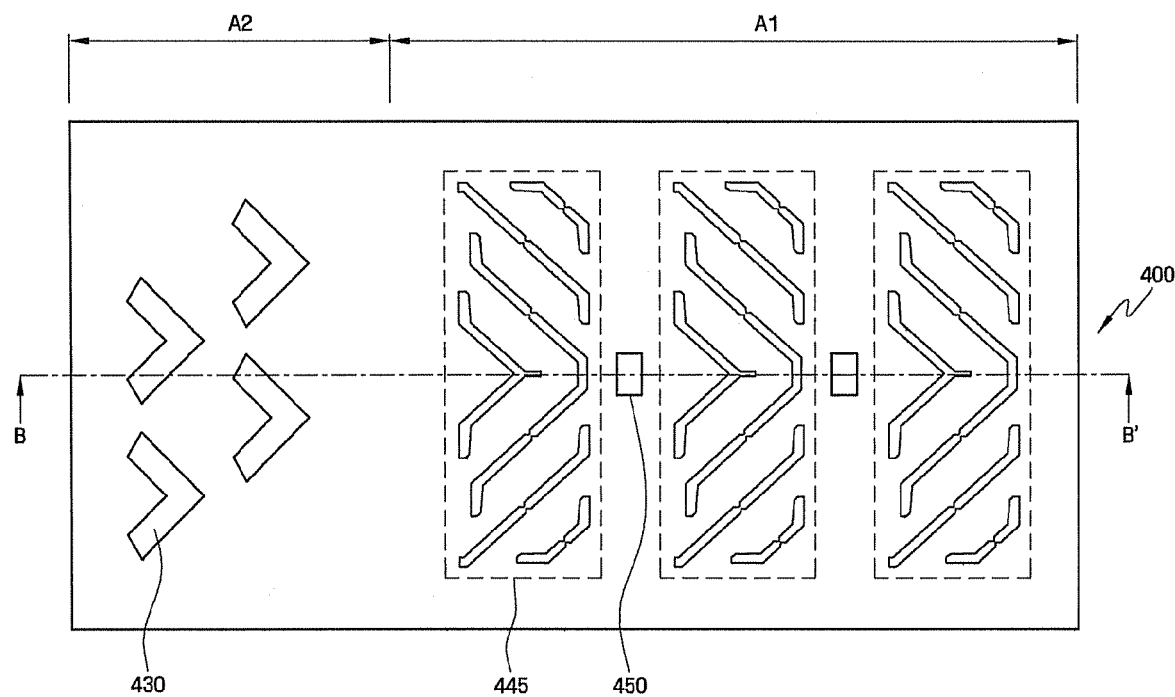
FIG. 13A is a plan view layout of a mask used to fabricate the second display plate shown in FIG. 12C.
Figure 13B:
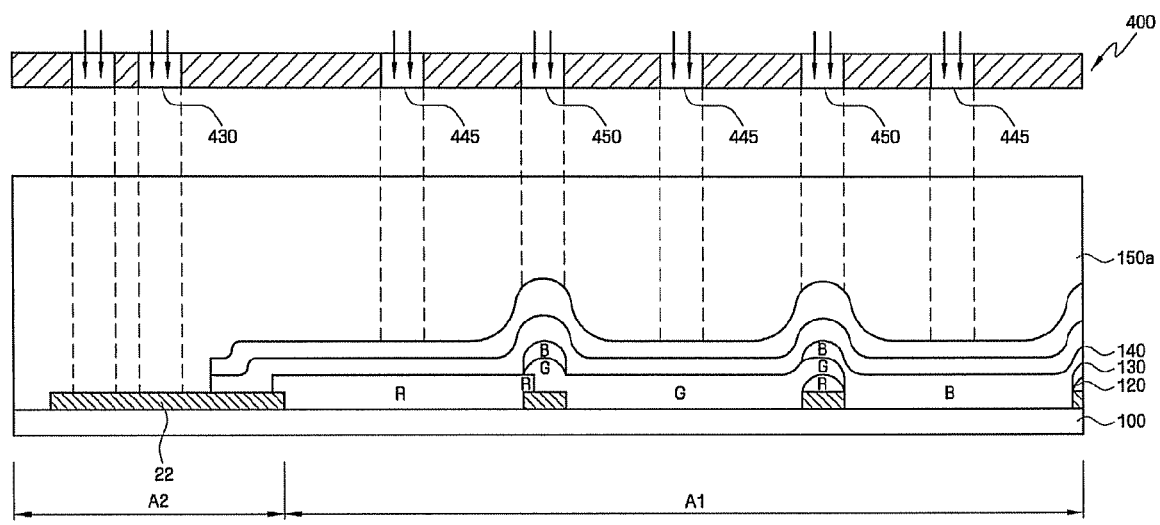
FIG. 13B is a cross-sectional view illustrating an exposure process using the mask shown in FIG. 13A.

FIGS. 13A and 13B are diagrams illustrating a method of fabricating the second display plate 20 shown in FIG. 12C.

Referring to FIG. 13A, a mask 430 includes an impurity blocking and liquid crystal flowing structure pattern 430, which is formed in the liquid crystal margin region A2, and a protrusion pattern 445 and a column spacer pattern 450, which are formed in the active region A1. When an object of exposure is a positive, photosensitive organic insulation film, the patterns 430, 445 and 450 may be shading patterns formed on a transparent substrate. When an object of exposure is a negative, photosensitive organic insulation film, the patterns 430, 445 and 450 may be transmitting patterns. When the impurity blocking and liquid crystal flowing structure 430 is higher than the protrusions 145 and the column spacers 150, the protrusion pattern 445 and the column spacer pattern 450 may be formed as slit patterns, grating patterns or semi-transmitting patterns. Here, critical dimensions ("CD") of a pattern positioned between slits or spacing between patterns, e.g., the width of the slit may be smaller than the resolution of an exposure device. When the semi-transmitting patterns are used, thin films having different transmittances or different thicknesses may be used to adjust transmittance during the fabrication of the mask 300.

FIG. 13B is a cross-sectional view illustrating an exposure process for forming the column spacers 150, the protrusions 145 and the impurity blocking and liquid crystal flowing structure 30.

Referring to FIG. 13B, the exposure process is performed on the substrate 100, on which the black matrix 110, the color filter 120, the overcoat layer 130, the common electrode 140 and a photosensitive organic insulation layer 150a have been sequentially formed, using the mask 400 shown in FIG. 13A. RGB color patterns 120R, 120G and 120B are stacked in a region in which each column spacer 150 will be formed. The black matrix 110, the color filter 120, the overcoat layer 130, the common electrode 140 and the photosensitive organic insulation layer 150a may be formed using fabrication processes well known to those skilled in the art of the present invention, and thus, the formation of them will be schematically described for sake of clarity of the present invention.

In the exposure process shown in FIG. 13B, the photosensitive organic insulation layer 150a is formed using a negative photosensitive organic insulation material.

As shown in FIG. 13B, the photosensitive organic insulation layer 150a is cross-linked during the exposure process, and therefore, only exposed portions of the photosensitive organic insulation layer 150a remain during a succeeding developing process, thereby forming the column spacers 150, the protrusions 145 and the impurity blocking and liquid crystal flowing structure 30 shown in FIG. 12C.

Although not shown, the second display plate 20 shown in FIG. 12A may be formed using the mask 400 from which the column spacer pattern 450 is removed in FIG. 13A. The second display plate 20 shown in FIG. 12B may be formed to have the column spacers 150 which are level to or higher than the impurity blocking and liquid crystal flowing structure 30 by adjusting a slit, grating or semi-transmitting pattern corresponding to the column spacer pattern 450 shown in FIG. 13A.

The second display plate 20 shown in FIGS. 12A through 12C is bonded to the first display plate 10 described with reference to FIGS. 8A through 9B and FIGS. 11A through 11C, thereby forming an LCD panel. In the first display plate 10 described with respect to FIGS. 11A through 11C, cutouts are not formed in a pixel electrode, but protrusions having the same pattern as the cutouts may be formed on the pixel electrode.

Figure 14:
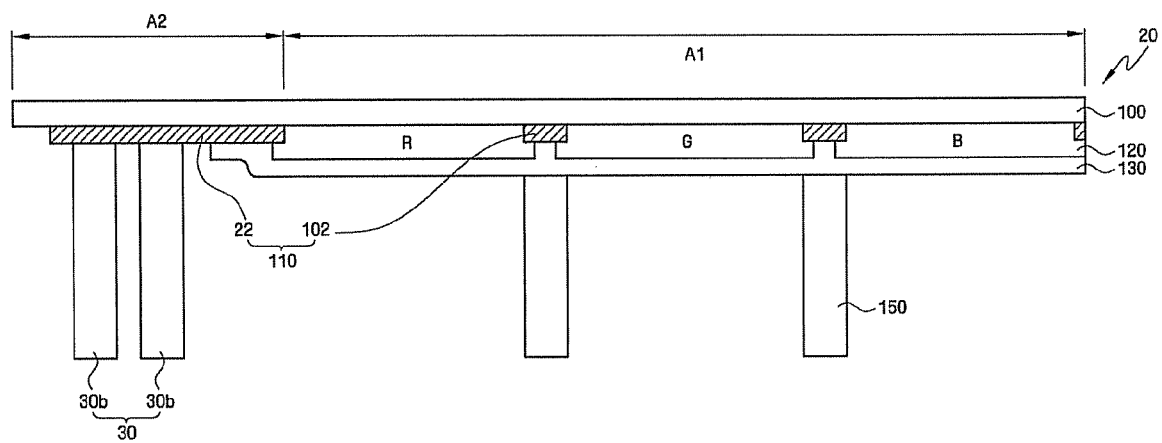
FIG. 14 is a cross-sectional view of a color filter array plate corresponding to a second display plate in an in plane switching ("IPS") mode LCD panel, according to an exemplary embodiment of the present invention.
Figure 15:
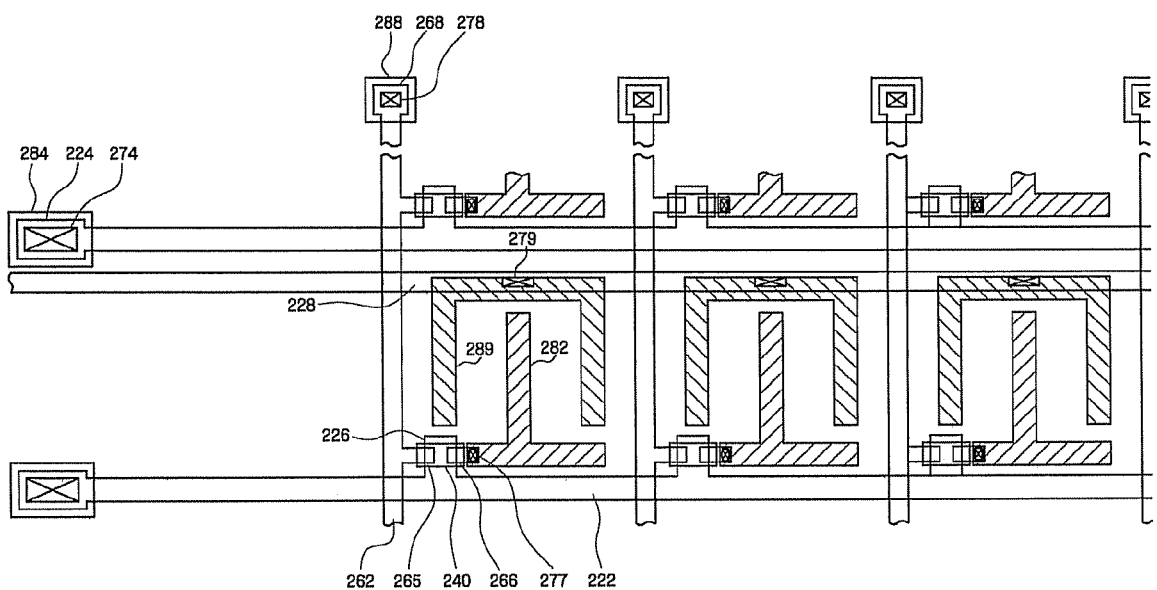
FIG. 15 is a plan view layout illustrating a TFT array plate corresponding to a first display plate forming the IPS mode LCD panel together with the second display plate shown in FIG. 14, according to an exemplary embodiment of the present invention.

FIGS. 14 and 15 are diagrams illustrating an LCD panel in an in plane switching ("IPS") mode in which the direction of major axes of liquid crystals is parallel with major surface planes defining the first and second display plates 10 and 20 when an electric field is not applied and an electric field is formed in a horizontal direction.

FIG. 14 is a cross-sectional view of a color filter array plate corresponding to the second display plate 20 in an IPS mode LCD panel, according to an exemplary embodiment of the present invention.

The color filter array plate shown in FIG. 14 is substantially the same as that shown in FIG. 6, with the exception that a common electrode is not formed. The impurity blocking and liquid crystal flowing structure 30 is formed on the portion 22 of the black matrix 110, which is formed in the liquid crystal margin region A2 using the same material as the column spacers 150. The column spacers 150 and the impurity blocking and liquid crystal flowing structure 30 can be formed using the mask 300 show in FIG. 7A. Thus, a description thereof will be omitted.

FIG. 15 is a layout illustrating a TFT array plate corresponding to the first display plate 10 forming the IPS mode LCD panel together with the second display plate 20 shown in FIG. 14, according to an exemplary embodiment of the present invention.

Referring to FIG. 15, unlike the first display plate 10 described with reference to FIGS. 7A and 7B, a pixel includes the pixel electrode 282 and a common electrode 289, which forms a horizontal electric field together with the pixel electrode 282. The common electrode 289 is connected through a contact hole 279 to a common line 228, which is formed to be parallel with the gate line 222 using the same material as the gate line 222 in a process in which the gate line 222 is formed, and receive a common voltage. In FIGS. 7A, 7B and 15, the same reference numerals denote the same members, and thus, descriptions thereof will be omitted.

Although not shown, the first display plate 10 forming an LCD panel together with the second display plate 20 shown in FIG. 14 may be implemented as a TFT array plate according to a DFS or PLS mode.

Referring to FIGS. 7A through 15, the impurity blocking and liquid crystal flowing structure 30 is formed on the second display plate 20. In particular, the impurity blocking and liquid crystal flowing structure 30 is formed using the same material as the column spacers 150 and/or the protrusions 145 in a same process in which the column spacers 150 and/or the protrusions 145 is formed. However, the impurity blocking and liquid crystal flowing structure 30 may be formed in a separate process from the column spacers 150 and/or the protrusions 145. In this case, the column spacers 150 may be formed to be dispersed on the second display plate 20 using scattering instead of using patterning.

Meanwhile, the impurity blocking and liquid crystal flowing structure 30 may be formed on the TFT array plate corresponding to the first display plate 10 or both of the first and second display plates 10 and 20.

Figure 16A:
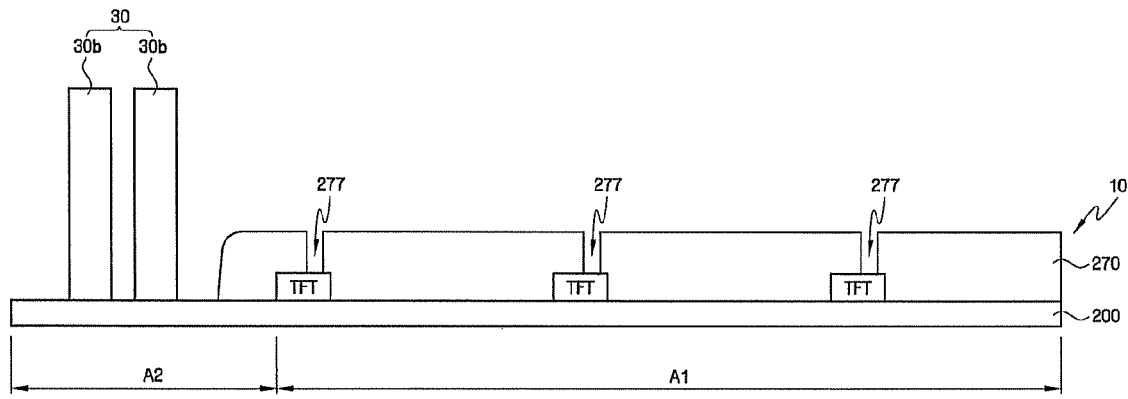
FIGS. 16A and 16B are cross-sectional views of TFT array plates with an impurity blocking and liquid crystal flowing structure, which serve as a first display plate in an LCD panel, according to exemplary embodiments of the present invention.
Figure 16B:
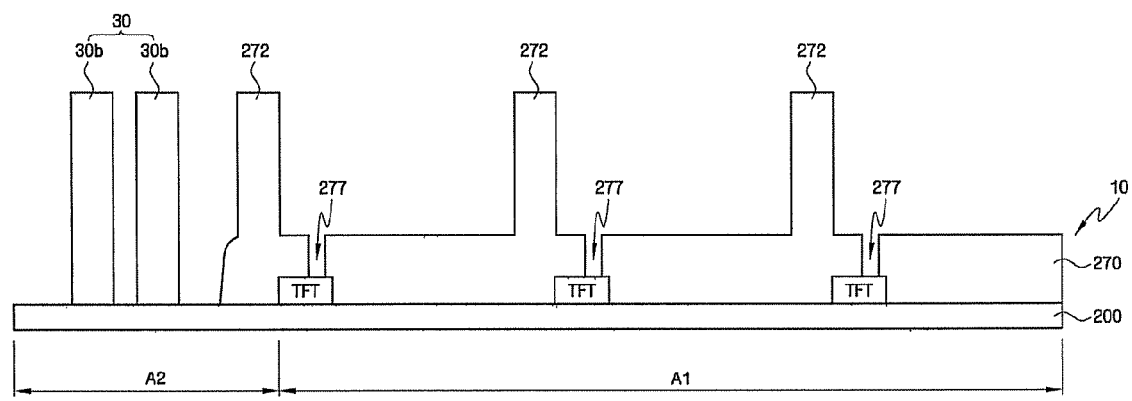

FIGS. 16A and 16B show examples in which the impurity blocking and liquid crystal flowing structure 30 is formed on the first display plate 10. Here, the first display plate 10 may be suitable for any one of the TN, VA and IPS modes. Thus, for the concise description, a lower TFT is illustrated in the shape of box and a pixel electrode is omitted.

Referring to FIGS. 16A and 16B, the impurity blocking and liquid crystal flowing structure 30 may be formed using the passivation layer 270 having the contact hole 277 exposing the drain electrode extension 267 (see FIGS. 8, 9 and 11) in the first display plate 10 according to the above-describe exemplary embodiments of the present invention. Here, the passivation layer 270 may be formed using an organic layer.

As shown in FIG. 16A, the impurity blocking and liquid crystal flowing structure 30 and contact holes 277 may be simultaneously formed. Alternatively, as shown in FIG. 16B, the impurity blocking and liquid crystal flowing structure 30, the contact holes 277, and column spacers 272 may be simultaneously formed.

Figure 17:
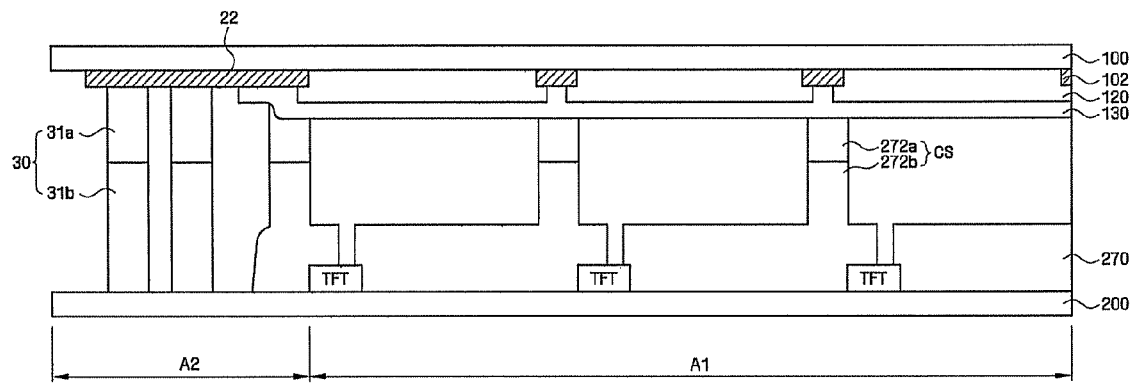
FIG. 17 is a cross-sectional view of an LCD panel in which both of the first and second display plates have an impurity blocking and liquid crystal flowing structure, according to an exemplary embodiment of the present invention.

FIG. 17 illustrates an example in which the impurity blocking and liquid crystal flowing structure 30 is formed on both of first and second display plates 10 and 20, according to an exemplary embodiment of the present invention. Here, the first display plate 10 and the second display plate 20 may be suitable for any one of the TN, VA and IPS modes. Thus, for the concise description, many members are schematically illustrated and a pixel electrode and a common electrode are omitted.

Referring to FIG. 17, a first structure 31a having a partial height of a cell gap is formed on the first display plate 10 and a second structure 31b having the rest height of the cell gap is formed on the second display plate 20. As a result, when the first and second display plates 10 and 20 are bonded to each other, the impurity blocking and liquid crystal flowing structure 30 is completed.

As shown in FIG. 17, like the first and second structures 31a and 31b, a first column spacer 272a having the partial height of the cell gap and a second column spacer 272b having a remaining height of the cell gap are formed on the first and second display plates 10 and 20, respectively, so that a column spacer CS is completed when the first and second display plates 10 and 20 are bonded to each other.

According to the present invention, impurities generated when an unhardened seal contacts liquid crystals are effectively blocked from flowing into an active region, and simultaneously, a flow path is provided for the liquid crystals so that the liquid crystals are effectively diffused.

Although the present invention has been shown and described with respect to a certain preferred embodiment or exemplary embodiments, it is obvious that equivalent alternatives and modifications will occur to those skilled in the art upon the reading and understanding of this specification and the annexed drawings. In addition, while a particular feature of the invention has been described with respect to one or more of the illustrated exemplary embodiments, such feature may be combined with one or more other features in the other exemplary embodiments, as may be desired and advantageous for any given or particular application.

What is claimed is:

1. A liquid crystal display panel comprising:
a first display plate and a second display plate which face each other with a liquid crystal layer therebetween;
a seal bonding the first display plate to the second display plate to prevent leakage of the liquid crystal layer; and
an impurity blocking and liquid crystal flowing structure disposed inside a perimeter of the seal and in a black matrix frame region between the seal and an active region to prevent impurities from flowing from the seal to the active region in the first and second display plates and provide a flow path allowing liquid crystals to flow to the seal, wherein the impurity blocking and liquid crystal flowing structure comprises patterns separated from each other by a space corresponding to the flow path,
each of the patterns has at least one trap groove facing the seal, and
the trap groove defined by at least one concave surface and convex surface opposite the at least one concave surface facing the seal.

2. The liquid crystal display panel of claim 1, wherein the impurity blocking and liquid crystal flowing structure is discontinuous due to the flow path.

3. The liquid crystal display panel of claim 1, wherein the patterns are arranged in at least two lines, and patterns in a first line alternate with patterns in a second line.

4. The liquid crystal display panel of claim 3, wherein both ends of each pattern in the second line partially overlap with two adjacent patterns, respectively, in the first line.

* * * * *